Oct. 27, 1953
E. C. SULLIVAN
2,657,300
TIME CONTROL MEANS FOR ELECTRICALLY
HEATED COOKING RECEPTACLES
Filed Nov. 6, 1952
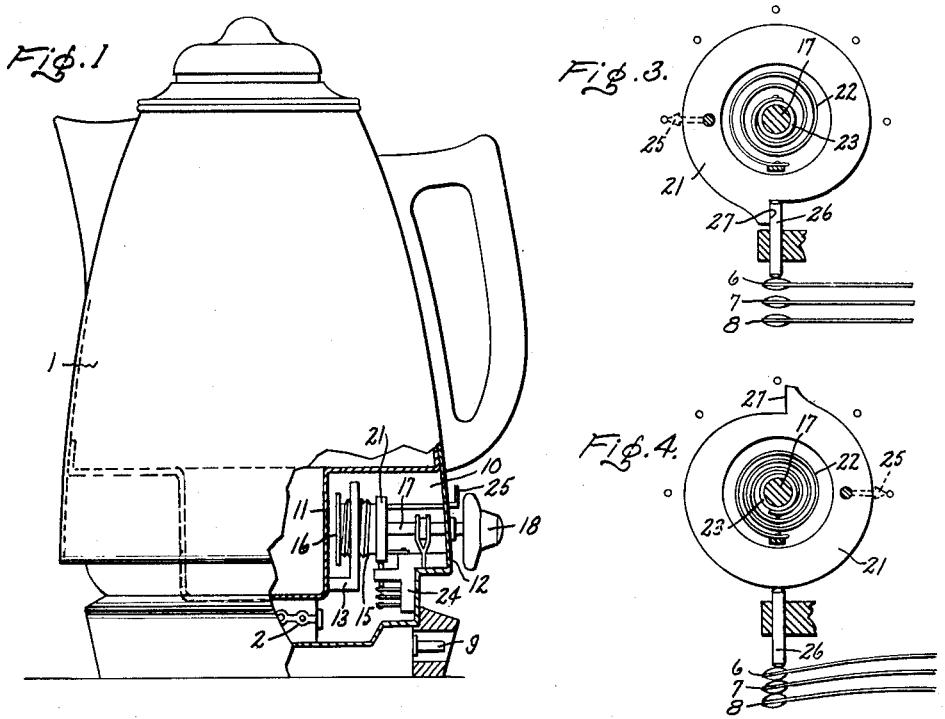
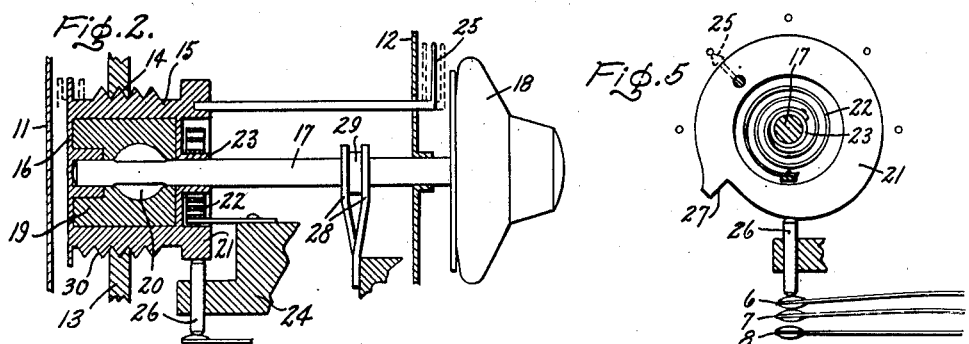
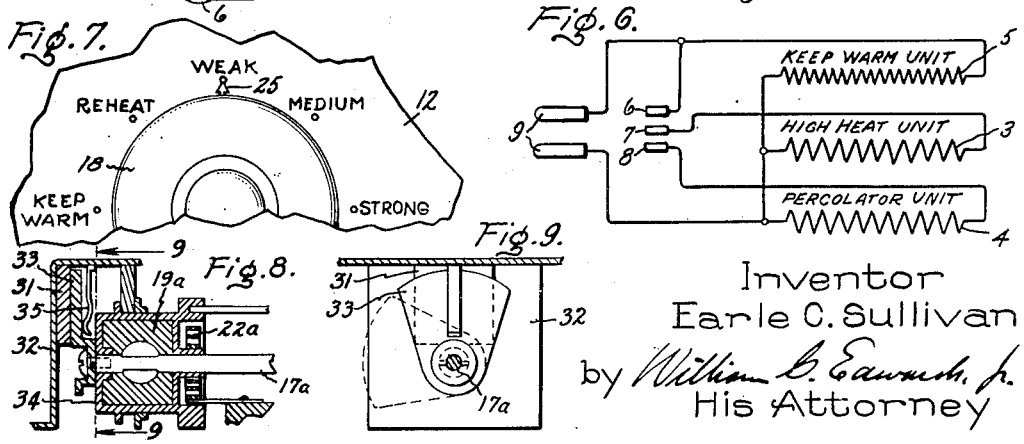
Inventor
Earle C. Sullivan
by *William C. Edwards, Jr.*
His Attorney Patented Oct. 27, 1953

2,657,300

UNITED STATES PATENT OFFICE 2,657,300

TIME CONTROL MEANS FOR ELECTRICALLY HEATED COOKING RECEPTACLES

Earle C. Sullivan, Bridgeport, Conn., assignor to General Electric Company, a corporation of New York Application November 6, 1952, Serial No. 319,034

6 Claims. (Cl. 219—44)

The present invention relates to electrically heated cooking receptacles wherein it is desired to time a cooking operation therein. The invention is well adapted for use in electric coffee percolators, and it is this application of my invention which I have elected specifically to illustrate and describe. It is to be understood, however, that the invention, as to certain aspects, is not limited to coffee percolators but may be used wherever found applicable.

The object of the invention is to provide an improved time control means responsive to the temperature of a cooking receptacle which is simple in structure, reliable in operation and which can be adjusted to vary the cooking time, and for a consideration of what I believe to be novel and my invention, attention is directed to the following specification and to the claims appended thereto.

According to the invention, switch means are provided for controlling the heating unit or units for the cooking receptacle, and for actuating the switch means there is provided a casing having a heat-conducting wall in spaced relation to the receptacle, and in the casing a fusible substance, such as Wood's alloy, which is normally a solid but which melts when heated to a predetermined low temperature to effect actuation of the switch means, there being provided for adjusting the time of such melting, means for varying the rate of transfer of heat from the receptacle to the heat-conducting wall of said casing.

In the drawing—

Fig. 1 is a side view partly broken away of a coffee percolator embodying the invention.

Fig. 2 is a sectional view through the control mechanism.

Figs. 3, 4 and 5 are detail views of a part of the control mechanism showing it in different operating positions.

Fig. 6 is a wiring diagram.

Fig. 7 is a detail view of a control knob.

Fig. 8 is a detail sectional view of a modification.

Fig. 9 is a sectional view taken on line 9—9, Fig. 8.

Referring to the drawing, 1 indicates a coffee percolator of suitable construction having electric heating unit indicated at 2. The heating unit may be of any suitable type and arranged in any suitable manner with respect to the coffee receptacle. In the present instance, as indicated in Fig. 6, there are provided three heating units, a "high heat" unit 3, a "percolator" unit 4, and a "keep warm" unit 5. The use and arrangement of such multiple heating units in coffee percolators is known. They are shown only diagrammatically. The circuits for the heating units are controlled by switch contacts 6, 7 and 8. The contact terminals for the electric circuit is indicated at 9.

The operating parts of the percolator mechanism are not illustrated as their specific construction forms no part of the present invention.

In the receptacle casing are walls which define a control chamber 10, the walls including a receptacle wall 11 which is subjected directly to the temperature of the water in the percolator, and an outside wall 12 which is remote from wall 11 and which is not subjected directly to the temperature of the water in the percolator. Positioned in chamber 10 and supported by walls thereof is a bracket 13 having an opening 14 in which is mounted a control casing 15 having a heat-conducting wall 16 which faces heat-conducting wall 11 and stands in spaced relation to it. Pivotally mounted in walls of casing 15 is a control shaft 17 which extends out through wall 12 and has an operating knob 18 on its outer end. Shaft 17 is connected to control casing 15 by a fusible substance 19 of low melting point such as Wood's alloy, 20 indicating wings on shaft 17 which project outwardly from the shaft into the fusible substance. Casing 15 at its outer end is provided with an annular cam 21 which controls switch contacts 6, 7 and 8. It is biased toward an "off" position or "normal" position by a coiled spring 22 housed in a recess at the outer end of casing 15 and connected at one end to a hub 23 on the casing and at the other end to a switch block 24 which carries contacts 6, 7 and 8 and is fixed to the outer wall of chamber 10. Connected to casing 15 is an indicating pointer 25 which cooperates with suitable indicia on the outer surface of wall 12.

Cam 21 controls switch contacts 6, 7 and 8 through the intermediary of a pin 26 which rides against the periphery of the cam and is biased against it by the spring blades which carry the contacts. The cam has a stop surface 27 and is biased by spring 22 to a position wherein the stop surface is in engagement with the pin, as shown in Fig. 3. In this cam position contacts 6, 7 and 8 are separated.

A friction drag is provided for shaft 17 which tends to hold it from turning. The drag is shown as comprising a pair of friction spring fingers 28 carried by wall 12 which ride against the opposite side surfaces of a friction disk 29 on shaft 17.

Means is provided whereby when casing 15 is turned in opening 14 the conductivity of the heat-conducting path between walls 11 and 16 is varied. As a means for accomplishing this result the connection between casing 15 and opening 14 is in the form of a screw thread as indicated at 30 whereby when the casing is turned in the opening its wall 16 is moved toward or away from wall 11 and varies the length of the heat-conducting path between the two walls.

Referring to Fig. 7 there are indicated for pointer 25 (and, hence, casing 15 and cam 21) positions marked "keep warm," "reheat," "weak," "medium," and "strong." When pointer 25 is at the "keep warm" position, cam stop 27 is in engagement with pin 26 as shown in Fig. 3 and is held in this position by spring 22. Contacts 6, 7 and 8 are separated as is clear from Fig. 6. If terminals 9 are connected to a source of current, the "keep warm" heating unit is in closed circuit. When pointer 25 is at the "reheat" position, cam 21 is shaped to move pin 26 to close contacts 6 and 7 as shown in Fig. 5. In this position a circuit is closed through the "high heat" unit. When pointer 25 is at the "weak" position or any position beyond the "weak" position, contacts 6, 7 and 8 are connected together as shown in Fig. 4 closing circuits through both the "high heat" unit and the "percolator" unit. The pitch of the screw thread connection 29 is in a direction such that as the pointer 25 and casing 15 are turned in a clockwise direction by knob 18 as viewed in Fig. 7, heat-conducting wall 16 will be moved away from wall 11 to decrease the heat conductivity of the path between the two walls.

Spring 22 is adjusted at assembly to give it an initial tension such that without the retarding action of the friction drag it is able to turn casing 15 from "strong" position back to the "keep warm" position. The spring fingers of the friction drag are then set to just prevent such rotation.

In operation the water and ground coffee are placed in the percolator in the well understood way and terminals 9 are connected to an electric power circuit. At this time, the receptacle being cold, the fusible substance 19 will be in its solid state so that shaft 17 is locked by it to casing 15. Shaft 17 is then turned to set pointer 25 at any point on the scale between "weak" and "strong" in accordance with the length of time it is desired to have percolation take place, such turning serving to adjust wall 16 away from wall 11. The parts will be held in the adjusted position by the friction drag. When thus positioned, contacts 6, 7 and 8 will be connected together as shown in Fig. 4 so that all three heating units are in circuit. As the water heats up percolation will start. At the same time heat will be transferred from wall 11 across the heat path to wall 16 to heat the fusible substance 19, the rate depending on the heat conductivity of the heat path. The parts are so correlated that at the end of a predetermined time the fusible substance will melt whereupon spring 22 will turn casing 15, cam 19 and pointer 25 back to the "keep warm" position. Shaft 17 will be held from turning by the friction drag comprising spring fingers 28 and disk 29. This will open the circuits through the "high heat" unit and the "percolator" unit, but the circuit through the "keep warm" unit will remain closed.

If at any time it is desired to reheat cold brew, the casing is turned to the Fig. 5 "reheat" position wherein the circuit is closed through the "high heat" unit. The operation is then as already described, the control returning automatically to the "keep warm" position as soon as a temperature is reached at which the fusible substance 19 melts.

In Figs. 8 and 9 is shown an embodiment of my invention wherein the heat conductivity of the heat-conducting path between the percolator wall and the heat-conducting wall of the casing containing the fusible substance is varied by varying the cross-sectional area of the heat-conducting path rather than its width, as in Figs. 1 and 2. To this end, a plate 31 of heat-conducting material is fixed to wall 32, which corresponds to wall 11 of Figs. 1 and 2, and in overlapping engagement therewith and adapted to be turned relative thereto to vary the extent of the overlap is a heat-conducting plate 33 which is attached to the heat-conducting wall 34 of the casing which contains the fusible substance for conveying heat from wall 32 to the fusible substance. Plate 33 is biased into engagement with plate 31 by a spring finger 35. Otherwise, the structure may be similar to that of Figs. 1 to 7 and the same reference characters with the exponent $a$ added have been applied to corresponding parts. With this arrangement, the heat conductivity of the path between the percolator wall and the heat-conducting wall 34 is varied by turning control shaft 17a to vary the extent to which plate 33 overlaps plate 31. When plate 33 occupies the position shown in full lines in Fig. 9, the overlap is at a maximum; hence the heat conductivity of the heat path is at a maximum. This may correspond to the "weak" position of the control knob. As plate 33 is turned clockwise as viewed in Fig. 9, the overlap is gradually decreased, becoming a minimum when the control knob reaches the "strong" position. This represents the position where the heat conductivity of the heat path is at a minimum. In Fig. 9, the dotted line position of plate 33 corresponds to "off" position of the control knob. The operation of the Figs. 8–9 modification will be obvious from the description given already in connection with the modification disclosed in Figs. 1–7, inclusive.

As pointed out above, my invention is well adapted for embodiment in a coffee-maker of the percolator type and has special utility when embodied in a control system as illustrated. However, it is to be understood that the invention may be utilized in other forms of electrically-heated receptacles.

What I claim as new and desire to secure by Letters Patent of the United States is:

1. In an electric heating device, a receptacle, an electric heating unit for the receptacle, an electric circuit for the heating unit, a switch for said circuit, and control means for said switch comprising a casing having a heat-conducting wall, said casing being mounted on the receptacle, means which forms a heat-conducting path between said casing and said heat-conducting wall, a fusible substance in said casing, means rendered operable by the melting of said fusible substance for actuating said switch, and means for varying the heat conductivity of said heat-conducting path.

2. In an electric heating device, a receptacle, an electric heating unit for the receptacle, an electric circuit for the heating unit, a switch for said circuit, and control means for said switch comprising a casing having a heat-conducting wall, said casing being mounted on the receptacle with said heat-conducting wall in spaced relation to a receptacle wall, the space providing a heat-conducting path between said heat-conducting wall and the adjacent receptacle wall, a fusible substance in said casing means rendered operable by the melting of said fusible substance for actuating said switch, and means for varying the heat conductivity of said heat-conducting path.

3. In an electric heating device, a receptacle, an electric heating unit for the receptacle, an electric circuit for the heating unit, a switch for said circuit, and control means for said switch comprising a casing having a heat-conducting wall, said casing being mounted on the receptacle with said heat conducting wall in spaced relation to a receptacle wall, the space providing a heat-conducting path between said heat-conducting wall and the adjacent receptacle wall, a fusible substance in said casing, means made operable by the melting of said fusible substance for actuating said switch, and means for adjusting the position of said casing with respect to the receptacle to vary the width of the heat-conducting path between the receptacle and said heat-conducting wall.

4. In an electric heating device, a receptacle, a plurality of electric heating units for the receptacle, electric circuits for said heating units, switches for said circuits, and control means for said switches comprising a casing having a heat-conducting wall mounted on said receptacle, means which forms a heat-conducting path between said casing and said heat-conducting wall, a fusible substance in the casing for controlling the operation of said switches, and means for adjusting the heat conductivity of said heat-conducting path to vary the rate of transfer of heat from said container to said fusible substance.

5. In an electric heating device, a receptacle, a plurality of electric heating units for the receptacle, electric ciruits for said heating units, switches for said circuits, and control means for said switches comprising a casing having a heat-conducting wall mounted on said receptacle, with the heat-conducting wall in spaced relation to a receptacle wall, a fusible substance in the casing, means responsive to the melting of said fusible substance for effecting operation of said switches, and means for adjusting the position of said heat-conducting wall with respect to said receptacle wall for varying the rate of transfer of heat from said container to said fusible substance.

6. In an electric heating device, a receptacle, an electric heating unit for the receptacle, an electric circuit for the heating unit, a switch for said circuit, and control means for said switch comprising a casing having a heat-conducting wall, said casing being mounted on the receptacle with said heat-conducting wall in spaced relation to the receptacle wall, overlapping heat-conducting plates positioned in the space between said heat-conducting wall and the adjacent receptacle wall for conducting heat therebetween, a fusible substance in said casing, means made operable by the melting of said fusible substance for actuating said switch, and means for adjusting the amount of overlap of said plates to vary the heat conductivity of the path between the receptacle wall and said heat-conducting wall.

EARLE C. SULLIVAN.

No references cited.